(12) United States Patent
Nishimura et al.

(10) Patent No.: US 12,305,565 B2
(45) Date of Patent: May 20, 2025

(54) THERMOSTAT DEVICE

(71) Applicant: NIPPON THERMOSTAT CO., LTD., Kiyose (JP)

(72) Inventors: Tetsuya Nishimura, Kiyose (JP); Tatsuya Takahata, Hiroshima (JP); Shinji Watanabe, Hiroshima (JP); Keita Watanabe, Hiroshima (JP); Takayuki Tominaga, Hiroshima (JP)

(73) Assignee: NIPPON THERMOSTAT CO., LTD., Kiyose (JP)

( * ) Notice: Subject to any disclaimer, the term of this patent is extended or adjusted under 35 U.S.C. 154(b) by 0 days.

(21) Appl. No.: 18/275,089

(22) PCT Filed: Feb. 16, 2022

(86) PCT No.: PCT/JP2022/006041
§ 371 (c)(1),
(2) Date: Jul. 31, 2023

(87) PCT Pub. No.: WO2022/176871
PCT Pub. Date: Aug. 25, 2022

(65) Prior Publication Data
US 2024/0093631 A1    Mar. 21, 2024

(30) Foreign Application Priority Data

Feb. 17, 2021   (JP) ................................ 2021-023601

(51) Int. Cl.
*F01P 7/16*   (2006.01)
*F01P 7/14*   (2006.01)

(52) U.S. Cl.
CPC ........... *F01P 7/16* (2013.01); *F01P 2007/146* (2013.01)

(58) Field of Classification Search
CPC .... F01P 7/16; F01P 7/161; F01P 7/165; F01P 7/167; F16K 2200/10; F16K 2200/00; F16K 2200/201; F16K 2200/20
(Continued)

(56) References Cited

U.S. PATENT DOCUMENTS

| | | | | |
|---|---|---|---|---|
| 3,207,437 A | * | 9/1965 | Bailey | G05D 23/1333 236/34 |
| 3,472,453 A | * | 10/1969 | Markland | F24D 3/10 237/63 |

(Continued)

FOREIGN PATENT DOCUMENTS

| | | | | |
|---|---|---|---|---|
| CN | 102105728 A | * | 6/2011 | ................ F01P 7/16 |
| EP | 3431767 A1 | * | 1/2019 | ................ F01P 7/16 |

(Continued)

OTHER PUBLICATIONS

PCT/ISA/210, "International Search Report for PCT International Application No. PCT/JP2022/006041," Mar. 22, 2022.
(Continued)

*Primary Examiner* — George C Jin
*Assistant Examiner* — Teuta B Holbrook
(74) *Attorney, Agent, or Firm* — HAUPTMAN HAM, LLP

(57) ABSTRACT

A thermostat device is provided that smoothens the flow of the coolant to keep the pressure loss small and can sufficiently secure the flow rate of the coolant from the radiator side to the engine side. A housing having a first inlet for introducing a coolant cooled by a radiator and a coolant outlet supplied to the internal combustion engine, a thermoelement accommodated in the housing that moves axially depending on the temperature of the coolant, a control valve that controls the amount of coolant introduced from the first inlet as the thermoelement moves in the axial direction, and (Continued)

a slope having an upward slope from the outlet side to the valve seat side inside the exit-side conduit extending from the valve seat in the housing, wherein the control valve is in contact with in the valve-closed state, toward the flow outlet of the coolant, are provided.

3 Claims, 8 Drawing Sheets

(58) Field of Classification Search
USPC .................................................. 236/34, 34.5
See application file for complete search history.

(56) References Cited

U.S. PATENT DOCUMENTS

| | | | | |
|---|---|---|---|---|
| 3,979,105 | A * | 9/1976 | Pool | .................. F16K 1/385 251/366 |
| 6,045,051 | A * | 4/2000 | Ieda | ...................... F01P 7/16 236/34.5 |
| 2006/0163373 | A1 * | 7/2006 | Inoue | ................. G05D 23/022 236/12.1 |
| 2011/0095091 | A1 | 4/2011 | Suda et al. | |
| 2012/0319028 | A1 * | 12/2012 | Kusakabe | ............ G05D 23/022 251/366 |
| 2016/0356203 | A1 | 12/2016 | Kusakabe | |
| 2018/0017155 | A1 | 1/2018 | Gooden | |
| 2020/0123962 | A1 | 4/2020 | Endo | |
| 2020/0333811 | A1 * | 10/2020 | Quevallier | ............ F16K 31/002 |

FOREIGN PATENT DOCUMENTS

| | | | |
|---|---|---|---|
| JP | 2000-073880 | A | 3/2000 |
| JP | 2005090726 | A * | 4/2005 |
| JP | 2005-330920 | A | 12/2005 |
| JP | 2011-231856 | A | 11/2011 |
| JP | 2012-112271 | A | 6/2012 |
| JP | 2012184693 | A * | 9/2012 |
| WO | 2010/004606 | A1 | 1/2010 |
| WO | 2019-066759 | A1 | 4/2019 |

OTHER PUBLICATIONS

Japan Patent Office, "Office Action for Japanese Patent Application 2021-023601," Jul. 19, 2023.
Extended European Search Report for European Application No. 22756189.1 dated Feb. 3, 2025; 8 pp.

* cited by examiner

THERMOSTAT DEVICE

RELATED APPLICATIONS

The present application is National Phase of International Application No. PCT/JP2022/006041 filed Feb. 16, 2022, and claims priority from Japanese Application No. 2021-023601, filed Feb. 17, 2021, the disclosure of which is hereby incorporated by reference herein in its entirety.

TECHNICAL FIELD

The present invention relates to a thermostat device disposed in the middle of a circulation flow passage through which a coolant is circulated between an internal combustion engine (hereinafter referred to as an engine) and a radiator mounted on automobiles, for example, to control the coolant temperature appropriately.

BACKGROUND ART

A thermostat device is provided with a thermo-element incorporating a thermal expansion body (wax) expanding and contracting by sensing a temperature change in the coolant flowing through the circulation flow passage between the engine and the radiator and functions to maintain the coolant at a predetermined temperature by opening and closing a control valve (valve body) by volume change caused by expansion and contraction of the thermal expansion body.

Namely, a thermo-operating unit, including a thermo-element incorporating a thermal expansion body and a control valve, is accommodated in a housing and, for example, disposed at the inlet side of the coolant passage of the engine. The thermo-operating unit closes the control valve when the coolant temperature is low, and the coolant is circulated through the bypass passage without passing through the radiator.

Further, the thermo-operating unit opens the control valve to have the coolant circulate through the radiator when the coolant temperature rises. With this, the thermo-operating unit operates to control the temperature of the coolant through the water jacket, which is the coolant passage in the engine, to a proper state.

Meanwhile, Patent Literature 1, for example, discloses a thermostat device that includes a housing having a flow inlet through which the coolant passing through the radiator flows in and a flow outlet through which the coolant flows out toward a water jacket and a water pump of the engine and also includes a thermo-operating unit having a thermo-element as a thermo-sensing unit and a control valve (valve body), open-close driven by the thermo-element, that opens and closes a passage communicating the flow inlet with a flow outlet of the coolant, wherein the thermo-operating unit is accommodated in the housing.

FIG. 10 schematically illustrates the coolant flow in the housing of a conventional thermostat device.

The thermostat device 11 is constructed by accommodating the thermo-operating unit 15 in an accommodation chamber in the housing 12 composed of a case 13 and an inlet 14.

A flow inlet 14a of the coolant from the radiator side is formed on the inlet 14 side composing the housing 12. Similarly, a flow inlet 13a of the coolant from the bypass passage detouring the radiator is formed on the case 13 side composing the housing 12.

The coolants from each flow inlet 13a and 14a are mixed in the housing 12 and delivered to the water jacket of the engine through the flow outlet 13b of the coolant.

Meanwhile, the thermo-operating unit 15 is provided with a thermo-element 15a (temperature-sensitive unit) incorporating a thermal expansion body (wax) reacting to the temperature of the coolant, a piston 15b extending and retracting due to the action of the thermal expansion body, a disc-shaped control valve 15c (valve body) attached to the thermo-element 15a, and a spring member 15d biasing the control valve 15c to a closed state by abutting on the inlet 14 side.

The tip end of the piston 15b is attached to the shaft support 14b formed in the inlet 14 and controls the valve-opened state of the control valve 15c depending on the temperature of the coolant applied to the thermo-element 15a, whereby the thermo-operating unit 15 operates to keep the coolant temperature applied to the engine to be appropriate by adjusting the flow-in amount of the coolant from the radiator side in particular.

CITATION LIST

Patent Literature

PTL 1: WO2010/004606

SUMMARY OF INVENTION

Technical Problem

Among this type of thermostat devices 11, as also shown in FIG. 10, there is one in which, the other end of the inlet-side conduit (an end on the accommodation chamber side), where the flow inlet 14a of the coolant from the radiator side is formed at one end, opens so that it faces one end of the thermo-element 15a in the direction of movement, while the other end of the exit-side conduit (the end on the accommodation chamber side), where the coolant flow outlet 13b is formed at one end, opens opposing to the side portion of the thermo-element 15a.

In such a case, when the position of the valve seat is at a position higher than the other end of the exit-side conduit and the interval therebetween is wide, the flow of the coolant from the flow inlet 14a of the coolant from the radiator side to the flow outlet 13b of the coolant may flow while bending in a crank shape as indicated by arrow C in FIG. 10. Such a flow of coolant causes to increase the water flow resistance, leading to a large pressure loss, which may arise a risk of failing to ensure the flow rate of the coolant from the radiator side to the engine side through the thermostat device 11 and to suppress the occurrence of cavitation.

The present invention is made focusing on the technical problems of conventional thermostat devices described above, and it is the main task to provide a thermostat device that can prevent a large pressure loss from occurring when the coolant flows from the radiator side to the engine side and ensure a sufficient flow amount of coolant flowing from the radiator side toward the engine side.

Solution to Problem

A thermostat device according to the present invention to solve the above-described problems is, provided with a housing that is disposed in a circulation passage for circulating coolant between an internal combustion engine and a radiator, inside which an accommodation chamber is formed, and which includes a first conduit and a second conduit for refluxing the coolant to the accommodation chamber; a thermo-element that is accommodated in the accommodation chamber and moves in an axial direction depending on the temperature of the coolant; a control valve for controlling the coolant reflux amount in the first conduit by the axial movement of the thermo-element; and a valve seat inside the housing on which the control valve abuts in a valve-closed state, wherein the second conduit opposes to a side portion of the thermo-element and construction is employed such that, on a one-end side of the direction of the movement of the thermo-element on the inner circumferential wall of the second conduit, a slope is formed inclining toward the one-end side as approaching the accommodation chamber from one end of the second conduit, and the accommodation-chamber-side end of the slope is located in a range from the position of the valve seat toward the one-end side.

According to the thermostat device, on one-end side of the movement direction of the thermo-element on the inner circumferential wall of the second conduit, a slope is formed inclining toward the one-end side as approaching the accommodation chamber from one end of the second conduit, and the accommodation-chamber-side end of the slope is located in a range from the position of the valve seat toward the one-end side.

This construction allows the flowing coolant between the first conduit and the second conduit to flow smoothly along the slope, preventing it from flowing in a crank-like bend, when the control valve is apart from the valve seat. Accordingly, significant pressure loss is prevented by reducing the flow resistance of the coolant in the housing, and sufficient coolant flow in the housing is ensured.

Construction is employed such that the first conduit is a first inlet-side conduit having a first flow inlet through which the coolant cooled by the radiator is introduced to the accommodation chamber at one end of the first conduit, and the second conduit is an exit-side conduit having a flow outlet at one end of the second conduit through which the coolant in the accommodation chamber is supplied to the internal combustion engine, and further the housing is provided with a second inlet-side conduit having a second flow inlet at one end through which the coolant heated in the combustion engine but not passing through the radiator is introduced.

The thermostat device of this invention is intended for the commonly known as "inlet control," where the thermostat device is placed on the inlet side of the coolant of the internal combustion engine. The housing has a second inlet-side conduit with a second flow inlet for introducing the coolant heated at the internal combustion engine without passing through the radiator. In this case, when a slope is equipped as described above, since the flowing around of the coolant from the radiator side to the thermo-element side can be prevented, the temperature sensitivity of the thermostat device to the coolant temperature flowing in from the second flow inlet can be improved.

Further, a structure is desirable that the accommodation-chamber-side end of the slope is located toward the one-end side than the position of the valve seat.

In addition, a configuration is adopted where the valve seat has a tapered shape with the diameter expanding from the one-end side toward the other-end side of the direction of movement of the thermo-element and the end of the valve seat side of the slope is connected to one end of the other side of the valve seat ends.

In the thermostat device of the present invention, the accommodation-chamber-side end of the slope is located toward the one-end side than the position of the valve seat. According to the above configuration, the accommodation chamber side end of the slope can be surely positioned within a range from the valve seat position toward the one-end side, even if a manufacturing error is included. This allows surely preventing the occurrence of significant pressure loss when the coolant is led from the radiator side to the engine side.

The thermostat device of the present invention has a configuration where the valve seat has a tapered shape with the diameter expanding from the one-end side toward the other-end side of the direction of movement of the thermo-element and the end of the valve seat side of the slope is connected to one end of the other-end side of the valve seat ends. This configuration allows the coolant to flow without stagnation from the valve seat whose diameter expands in a tapered shape to the slope, and can provide a thermostat device that reduces pressure loss with low flow resistance in the housing.

Advantageous Effects

The present invention allows for inhibiting the occurrence of significant pressure loss when the coolant flows from the radiator side to the engine side and for providing a thermostat device that sufficiently ensures the flow amount of coolant from the radiator side to the engine side.

DESCRIPTION OF EMBODIMENTS

The thermostat device of the invention will be described based on an embodiment, which is employed in an "inlet-control" type cooling system where the thermostat device is disposed at the inlet side of the coolant of an internal combustion engine.

FIGS. 1 to 7 show the first embodiment of the thermostat device 1, of which FIGS. 1 to 5 show the overall configuration of the thermostat device 1.

The thermostat device 1 is constructed so that a thermo-operating unit 2, which is placed in a circulation passage for circulating coolant between the engine and radiator and controls the temperature of the coolant to be supplied to the engine, is accommodated in a housing 3.

In other words, the thermostat device 1 is disposed at an intersection of a coolant passage from the radiator side and a bypass passage from an outlet side of the engine not passing through the radiator. The thermostat device 1 operates to appropriately control the temperature of the coolant toward an inlet of the engine, by mixing the coolant cooled at the radiator and the coolant through the bypass passage heated at the engine.

Figure 1:
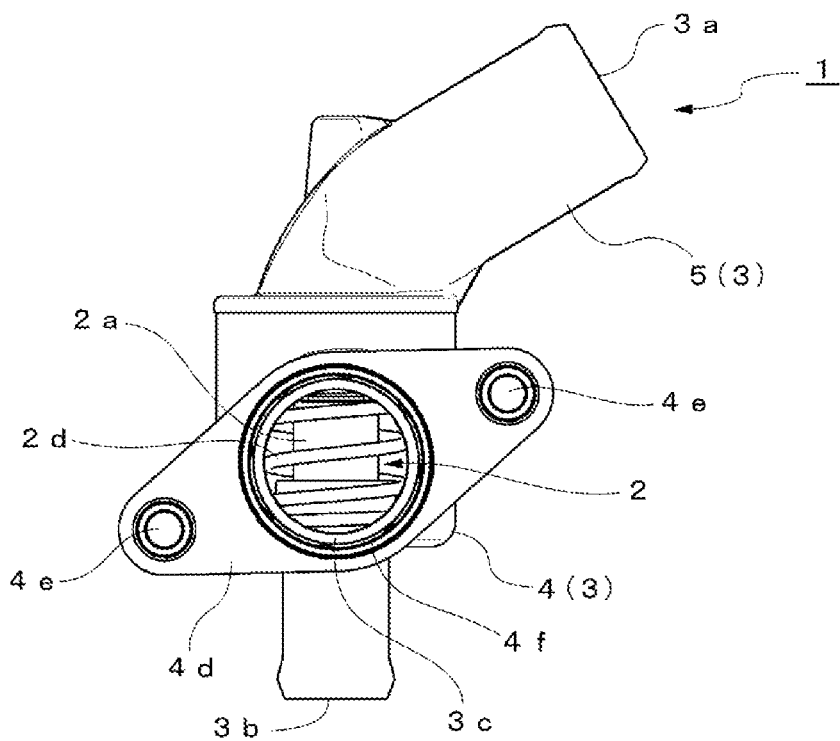
FIG. 1 is a front view of the overall configuration of the first embodiment of the thermostat device of this invention.

For the convenience of description, in the posture of the thermostat device 1 shown in FIG. 1, the upper/lower portion of the figure is simply expressed by the "upper"/"lower".

In the embodiment, the housing 3 constituting an outer frame of the thermostat device 1 is composed of a case 4 and an inlet 5 joined and attached to the top of the case 4, both molded of a resin material.

Figure 2:
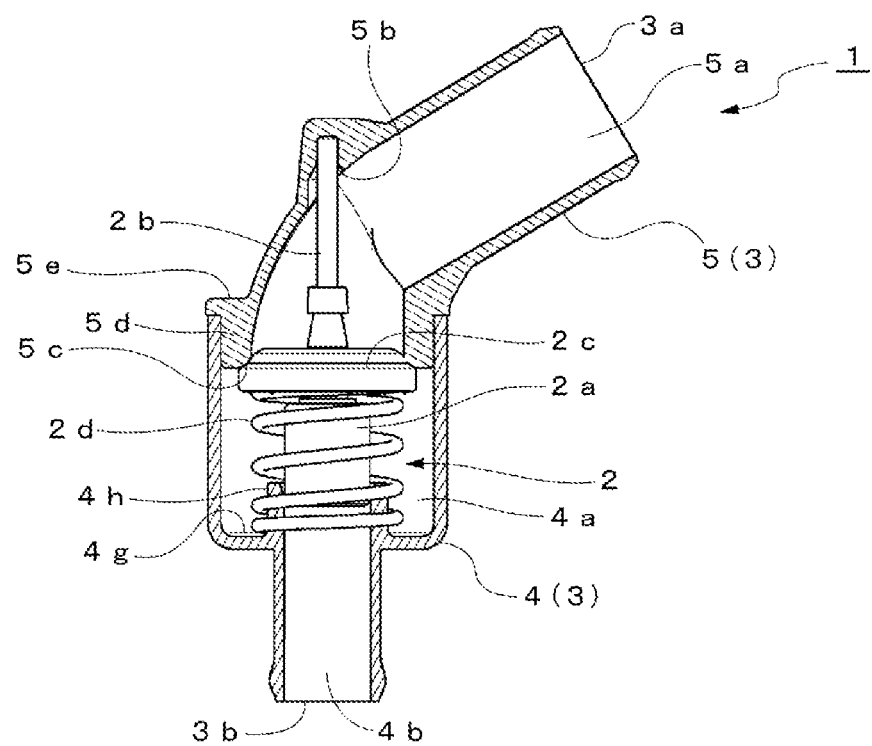
FIG. 2 shows a partial cross-sectional view of the front half of the housing in FIG. 1, cut away.

The inlet 5 is provided with a first inlet-side conduit 3a (a first conduit recited in claim 1) having a first flow inlet 5a formed in a cylindrical shape that receives the coolant from the radiator side, and the first inlet-side conduit 3a is formed in an approximately 60 degrees bent state against the moving axis of a thermo-operating unit 2 described later (See FIGS. 1 and 2).

Further, in the case 4, a unit accommodating space 4a to be as an accommodation chamber, which accommodates the thermo-operating unit 2 in the central area is formed, and also a second inlet-side conduit 3b having a cylinder-shaped second flow inlet 4b downward from the unit accommodating space 4a is formed; the coolant from the bypass passage is introduced to the second flow inlet 4b.

Further, in the case 4, an exit-side conduit 3c (a second conduit recited in claim 1) is formed, having a flow outlet 4c of the coolant to be supplied to the engine side toward the direction perpendicular to the moving axis of the thermo-operating unit 2.

The exit-side conduit 3c having the flow outlet 4c of the coolant is constituted enabling it to be disposed on the upstream side of the water pump for delivering the coolant to the engine; for this purpose, a flange 4d for directly connecting the thermostat device 1 to the water pump (not shown) side and bolt insertion holes 4e (See FIGS. 4 and 5) for bolts for fastening at opposing positions by 180 degrees on the flange 4d are formed. An annular-shaped packing 4f to be joined with the water pump side is attached so as to surround the flow outlet 4c of the coolant along the opening.

A cylinder-shaped thermo-element 2a (a temperature sensing unit) incorporating a thermal expansion body (wax) that expands and contracts depending on the coolant temperature is provided in the thermo-operating unit 2 accommodated in the unit accommodating space 4a of the housing 3; a piston 2b disposed along the axis of the thermo-element 2a operates to advance and retract from the thermo-element 2a due to the expansion and contraction of the thermal expansion body.

The tip portion of the piston 2b is fitted to a shaft support 5b formed at the central upper portion inside the inlet 5 constituting the housing 3 and attached to the housing 3.

Thus, the cylinder-shaped thermo-element 2a operates to move along the axial direction in the unit accommodating space 4a along with the advance and retraction of the piston 2b; that is, the thermo-element 2a moves up and down in the embodiment.

In other words, the direction of the movement of the thermo-element 2a is vertical, and the one-end side and the other-end side of the moving direction of the thermo-element 2a in the claims are the up-side and the down-side, respectively.

A disc-shaped control valve (valve body) 2c is attached to the upper portion of the thermo-element 2a; the control valve 2c creates the valve-closed state by abutting an annular valve seat 5c formed at the lower opening of the inlet 5.

This means that the valve seat 5c is formed to have a tapered shape with the diameter expanding from the one-end side toward the other-end side of the direction of movement of the thermo-element 2a.

Further, a spring member 2d is disposed to surround the thermo-element 2a such that the one end thereof comes into contact with the control valve 2c, and the other end of the spring member 2d abuts a case inner bottom 4g of the case 4 (See FIGS. 2 and 3) to surround the guide 4h formed to erect from the case inner bottom 4g of the case 4.

Accordingly, the spring member 2d applies a biasing force so as to press the disc-shaped control valve 2c against the annular valve seat 5c formed on the inlet 5.

The guide 4h supports the lower part of the thermo-element 2a slidably. The guide 4h is provided with a hole, a groove, or a cutout not shown, and the coolant entering the housing 3 from the second flow inlet 4b can flow into the unit accommodating space 4a through the hole, the groove, or the cutout of the guide 4h.

According to thus-configured thermostat device 1, the coolant supplied to the second flow inlet 4b from the bypass passage side is mainly supplied to the thermo-element 2a.

When the coolant temperature from the bypass passage side rises, the thermal expansion body incorporated in the thermo-element 2a expands and the piston advances (protrudes).

This causes the control valve 2c attached to the thermo-element 2a retracts toward the second flow inlet 4b side, resisting the biasing force of the spring member 2d to open the valve, and the coolant via the radiator is introduced through the first flow inlet 5a.

Resultantly, the coolant from the first flow inlet 5a and the coolant from the second flow inlet 4b are mixed and delivered to the water jacket of the engine through the flow outlet 4c of the coolant. This allows controlling the coolant temperature through the water jacket of the engine to be in an appropriate state.

Figure 3:
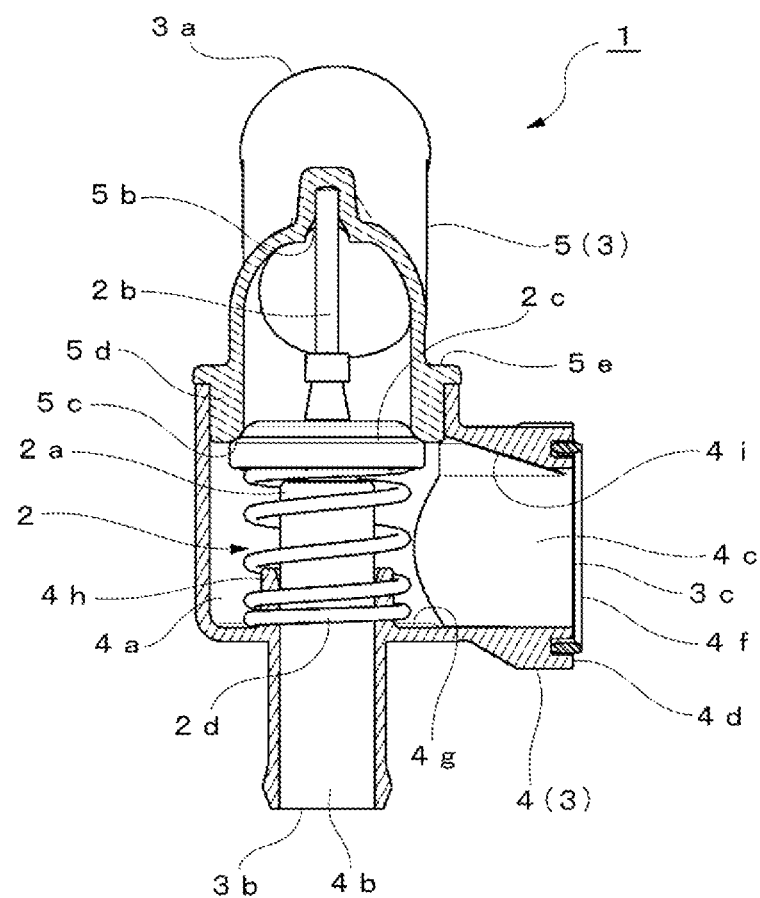
FIG. 3 is a partial cross-sectional view of the left half of the housing cut away, viewed from the cutting-away direction.
Figure 4:
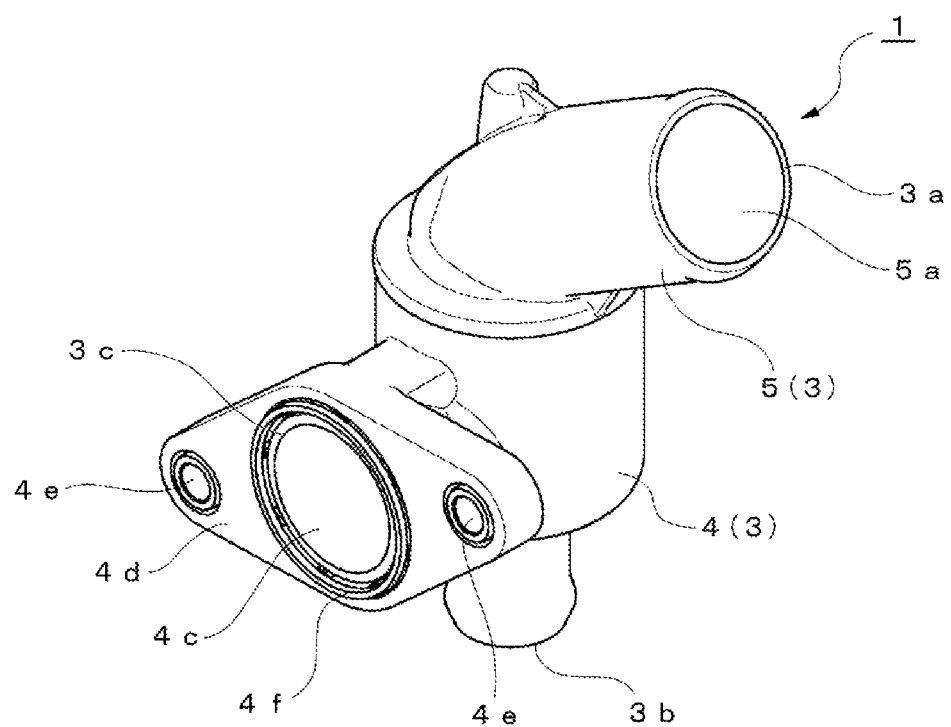
FIG. 4 is a perspective view showing the overall configuration of the thermostat device.
Figure 5:
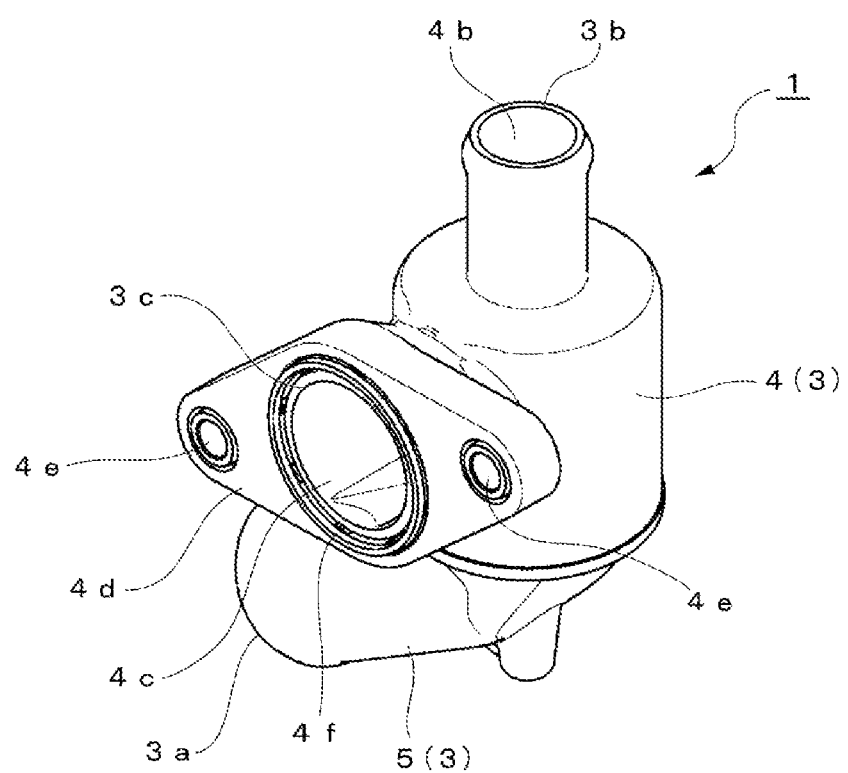
FIG. 5 is a perspective view of the thermostat in the state in which the top and bottom are inverted from the state shown in FIG. 4.

As shown in FIG. 3 of the embodiment, the exit-side conduit 3c toward the flow outlet 4c of the coolant from the valve seat 5c in the housing 3 is formed in a direction perpendicular to the direction of the movement axis of the thermo-element 2a, the accommodation-chamber-side end of the exit-side conduit 3c opposes to the side portion of the thermo-element 2a. In addition, a slope 4i is formed which increases the inner diameter of the exit-side conduit 3c from the flow outlet 4c side toward the valve seat 5c in the exit-side conduit 3c leading from the valve seat 5c toward the flow outlet 4c of the coolant.

Figure 6:
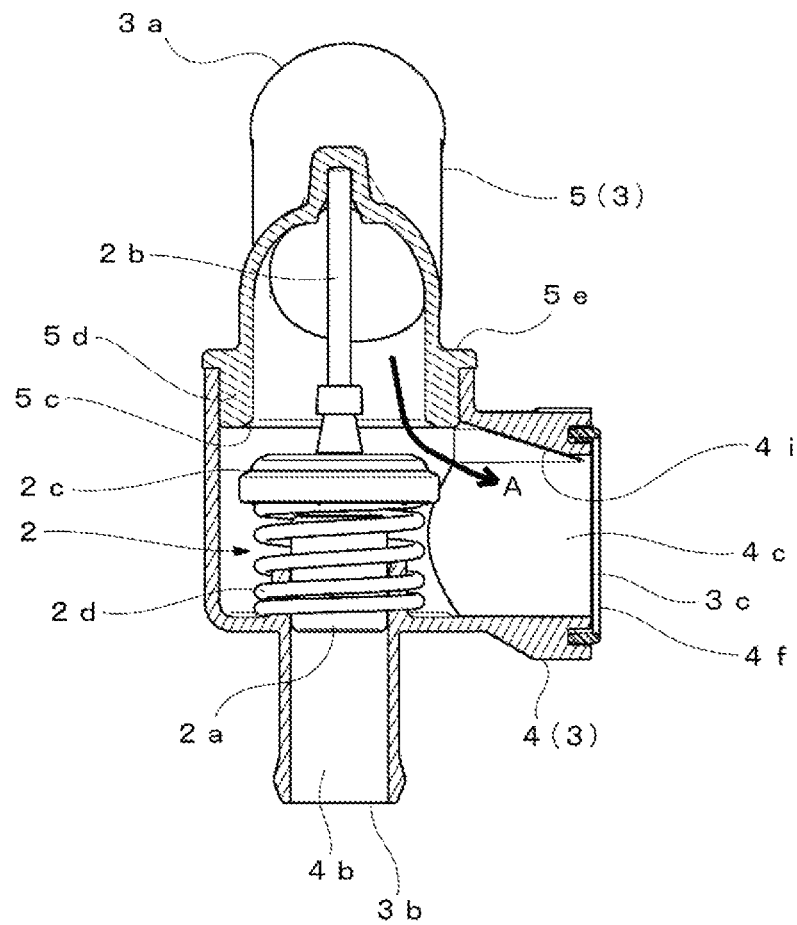
FIG. 6 is a partial cross-sectional view showing the flow of the coolant when the control valve is open.
Figure 7:
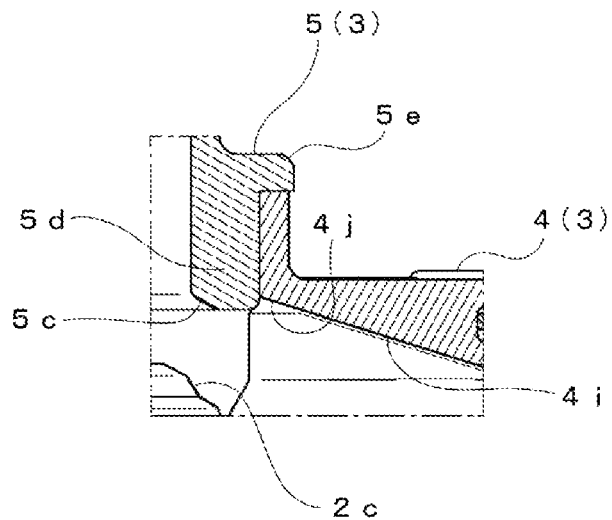
FIG. 7 is an enlarged cross-sectional view of the slope formed in the conduit of the coolant outlet.

The slope 4i is also shown in FIGS. 6 and 7 illustrating the valve-opened state where the control valve 2c leaves from the valve seat 5c.

In particular, part of the slope 4i is shown in an enlarged state in FIG. 7, and the accommodation-chamber-side end 4j of the slope 4i locates in a range from the position of the valve seat 5c toward the one-end side of the moving direction of the thermo-element 2a.

More specifically, inlet 5 has a brim 5e the outer diameter of which is larger compared to the other portion; the brim 5e is joined with the upper opening edge of the case 4 by welding, for example, whereby the case 4 and the inlet 5 are integrated as the housing 3. Further, the inlet 5 has an annular protrusion 5d protruding inward the case 4 from the inner peripheral edge of the brim 5e, and the valve seat 5c is formed at the lower end of the annular protrusion 5d. In other words, a configuration is adopted that by providing the annular protrusion 5d, the lower end of the valve seat 5c is located at the same position as the upper end of the slope 4i (accommodation-chamber-side end 4j) or lowered therefrom, downward in the drawing.

By setting the position of the accommodation-chamber-side end 4j of the slope 4i as described above, the coolant toward the flow outlet 4c side with the opening of the control valve 2c is led to the flow outlet 4c side of the coolant along the slope 4i without resistance, as shown by the arrow approaching the A direction in FIG. 6. This allows to provide a thermostat device 1 having little flow resistance and reduced pressure loss in the housing 3, as recited in the paragraph of the Advantageous Effect of the Invention.

Meanwhile, in the thermostat device 1 of the first embodiment, which is provided with the second flow inlet 4b through which the coolant from the bypass passage not passing through the radiator is introduced, upon opening the control valve 2c, the coolant from the radiator side flows efficiently toward the flow outlet 4c side owing to the slope 4i. Because of this, the cooled coolant passing through the radiator is inhibited from flowing into the thermo-element 2a side, and the temperature sensitivity (sensitivity to the temperature of the coolant circulating through the engine) is improved, whereby the hunting is inhibited.

Further, in the thermostat device 1 of the first embodiment, the housing 3 is provided with an inlet 5 having the first inlet-side conduit 3a and the case 4 having the exit-side conduit 3c. The inlet 5 has the annular protrusion 5d protruding inward the case 4, and the valve seat 5c is formed on the tip portion of the annular protrusion 5d. Since the position of the valve seat 5c is lowered by the annular protrusion 5d as described above, it is easy to locate the accommodation-chamber-side end 4j of the slope 4i in a range from the valve seat position to the upper side (one-end side of the moving direction of the thermo-element 2a).

Further, in the thermostat device 1 of the first embodiment, a brim 5e protruding outward from the proximal end (the opposite side of the tip end) of the annular protrusion 5d is welded to the case 4. As described above, since the valve seat 5c is formed on the tip end of the annular protrusion 5d, the valve seat 5c can be separated from the welding portion. This allows, in a state where the control valve 2c and the valve seat 5c are abutting on each other, to prevent the leaking of coolant from therebetween, due to the distortion of the valve seat 5c caused by welding.

In the thermostat device 1 of the first embodiment described above, the inlet 5 and case 4 which compose the housing 3 are made of a resin material as already described; both are joined by welding preferably, but the joining method can be appropriately changeable. The inlet 5 and the case 4 can be composed using metal material.

Figure 8:
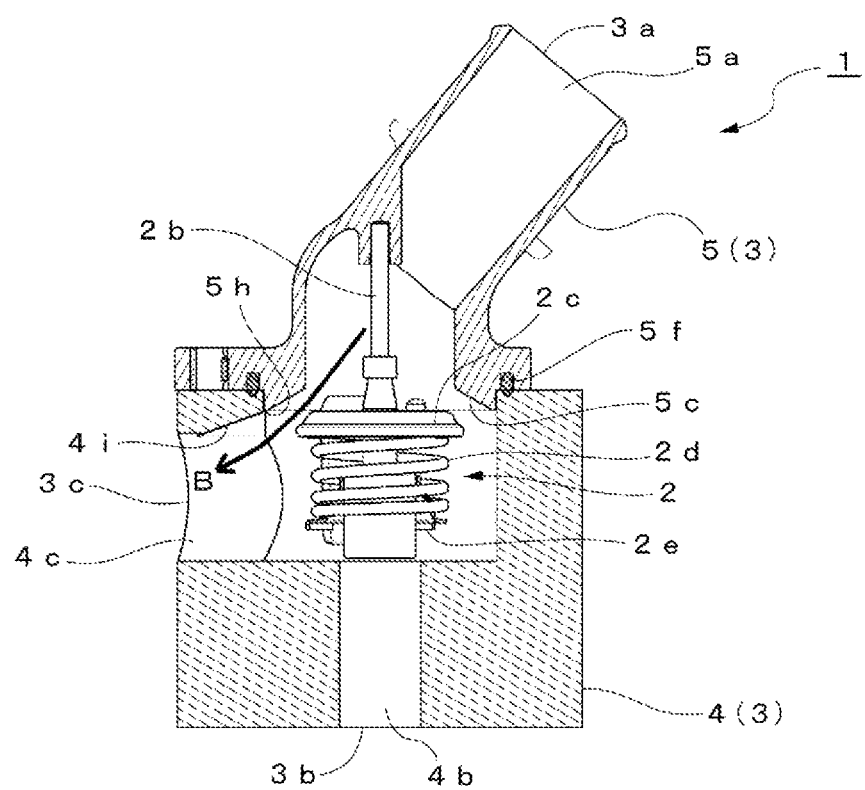
FIG. 8 is a partial cross-sectional view showing the main part of the second embodiment of the thermostat device of this invention.
Figure 9:
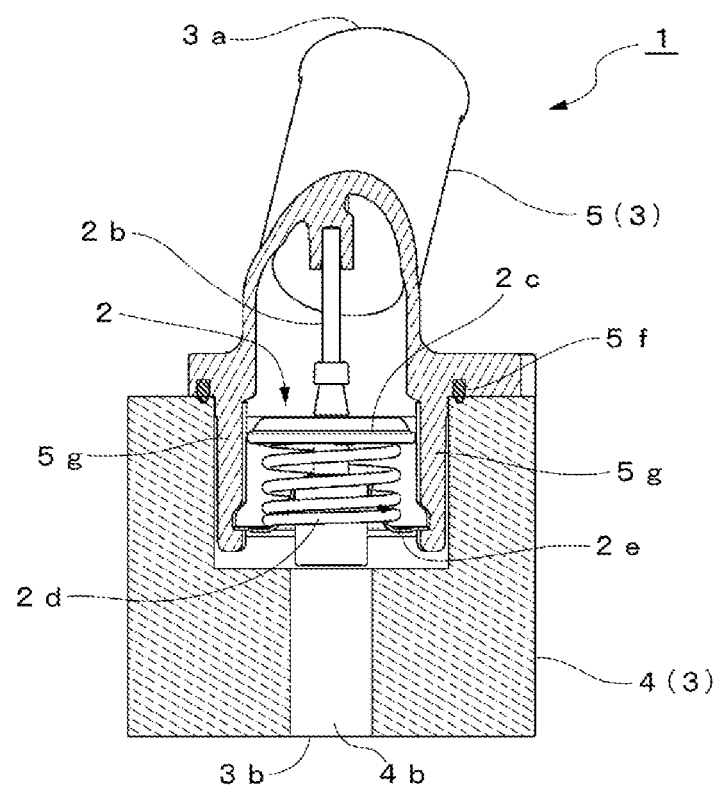
FIG. 9 is a partial cross-sectional view of the thermostat device in FIG. 8, axially rotated by 90 degrees.
Figure 10:
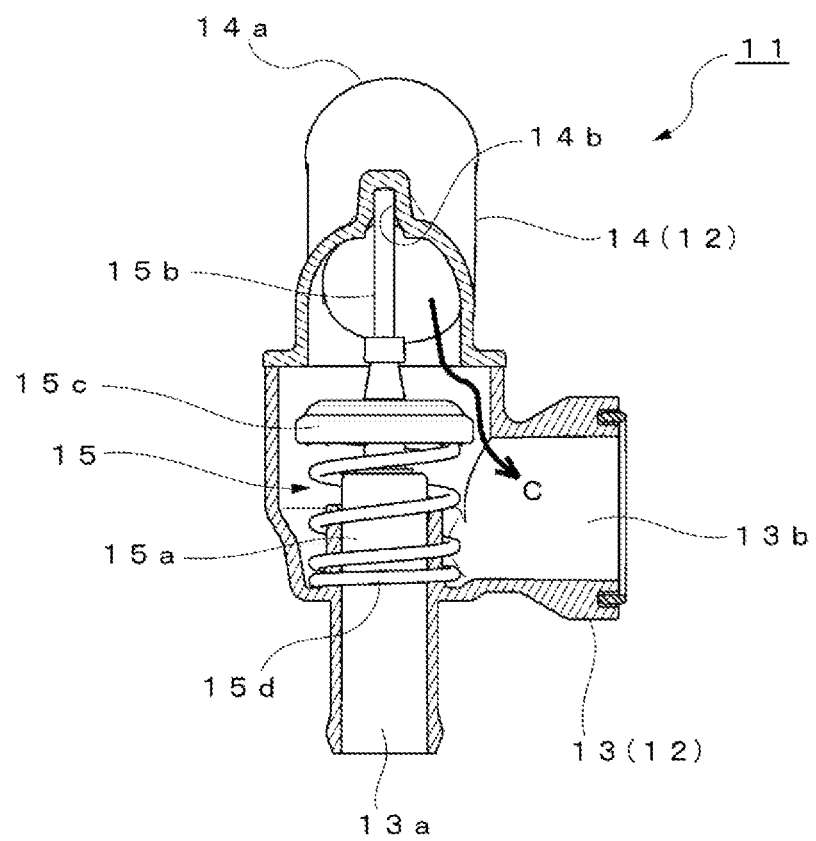
FIG. 10 is a partial cross-sectional view showing an embodiment of the flow of coolant in a conventional thermostat device.

FIGS. 8 and 9 show the thermostat device 1 of a second embodiment according to the present invention. In FIGS. 8 and 9 showing the second embodiment, members that perform the same functions as that of the thermostat device 1 of the first embodiment shown in FIGS. 1 through 7 described before are named with the same reference signs; thus, the detailed description is appropriately omitted.

In the thermostat device 1 of the second embodiment, the case 4 and the inlet 5 which compose the housing 3 are both formed of a metal material and both are joined through a packing 5f annularly embedded in the inlet 5.

Further, in the thermostat device 1 of the second embodiment, the other end of the spring member 2d biasing the control valve 2c toward the valve seat 5c side is received by the spring receiving member 2e; a structure is employed that the spring receiving member 2e is supported by an opposing pair of legs 5g (See FIG. 9) integrally formed with the inlet 5.

Also, in the thermostat device 1 of the second embodiment, as shown in FIG. 8, in the exit-side conduit 3c from the valve seat 5c toward the flow outlet 4c of the coolant, a slope 4i is formed, which inclines toward the one-end side of the moving direction of the thermo-element 2a as approaching the accommodation chamber 4a from the flow outlet 4c side.

Further, in this embodiment, the valve-seat 5c side end of the slope 4i is constructed to be continued with a taper-end portion 5h forming the valve seat 5c.

With the thermostat device 1 of the second embodiment, the coolant toward the flow outlet 4c side caused by the opening of the control valve 2c is resistlessly led toward the flow outlet 4c side of the coolant along the slope 4i continued with the valve seat 5c, as shown by the arrow toward B direction in FIG. 8.

This allows providing a thermostat device 1 having low flow resistance and reduced pressure loss, in the housing 3.

Accordingly, the thermostat device 1 according to the present invention including the embodiments 1 and 2 allows that the flow rate of the coolant toward the engine side from the radiator side can be secured sufficiently, and cavitation is suppressed.

This can reduce the drive power of the water pump, which flows the coolant in the circulation passage, including the engine and radiator. In addition, it can contribute to providing a thermostat device with a more down-sized outer structure.

The thermostat device 1 of the first and second embodiments described above includes a second flow inlet 4b into which a coolant from the bypass passage is introduced. The present invention can provide similar effects if applied to a thermostat device, shown in PTL 1 as an embodiment, in which a thermostat device is provided with an inlet-side conduit to which a flow inlet for introducing the coolant cooled by the radiator is formed, an exit-side conduit to which a flow outlet of coolant to be supplied to the internal combustion engine, without including a flow inlet of the coolant from the bypass passage.

Further, the thermostat device 1 according to the present invention is described based on an embodiment where the thermostat device is employed in an inlet-control-type cooling system where the thermostat device is disposed at the inlet side of the coolant of the internal combustion engine. However, similar effects are obtainable in that pressure loss is inhibited, even when the thermostat device is employed in an outlet-control-type cooling system disposed at the outlet side of the coolant of the internal combustion engine.

INDUSTRIAL APPLICABILITY

As described above, the thermostat device according to the present invention is useful as a device for supplying coolant to an engine of an automobile and is particularly suitable for use in controlling the temperature of coolant supplied to the engine to a proper state.

REFERENCE SIGNS LIST

1 Thermostat device
2 thermo-operating unit
2a thermo-element
2b piston
2c control valve (valve body)
2d spring member
2e spring receiving member
3 housing
3a first inlet-side conduit (first conduit)
3b second inlet-side conduit
3c exit-side conduit (second conduit)
4 case
4a unit accommodating space (accommodation chamber)
4b bypass passage side inlet (second flow inlet)
4c flow outlet
4d flange
4e bolt insertion hole
4f packing
4g case inner bottom
4h guide
4i slope
4j accommodation-chamber-side end
5 inlet
5a radiator-side inlet (first flow inlet)
5b shaft support
5c valve seat
5d annular protrusion
5e brim
5f packing
5g leg
5h taper-end portion.

The invention claimed is:

1. A thermostat device, comprising:
a housing that is disposed in a circulation passage for circulating coolant between an internal combustion engine and a radiator, inside which an accommodation chamber is disposed, and which includes a first conduit and a second conduit for refluxing the coolant to the accommodation chamber;
a thermo-element that is accommodated in the accommodation chamber and configured to move in an axial direction depending on the temperature of the coolant;
a control valve for controlling an amount of coolant reflux in the first conduit by the axial movement of the thermo-element; and
a valve seat inside the housing on which the control valve abuts in a valve-closed state, wherein
the second conduit opposes a side portion of the thermo-element, and on a direction side, to which the control valve approaches the valve seat, which is a one-end side of the direction of the movement of the thermo-element on the inner circumferential wall of the second conduit,
a slope inclining toward the one-end side as approaching the accommodation chamber from one end of the second conduit, and
the accommodation-chamber-side end of the slope is located toward the one-end side than relative to the position of a lower end of the valve seat.

2. The thermostat device according to claim 1, wherein the first conduit is a first inlet-side conduit, at one end of the first conduit, having a first flow inlet through which the coolant cooled by the radiator is introduced to the accommodation chamber, and the second conduit is an exit-side conduit, at one end of the second conduit, having a flow outlet through which the coolant in the accommodation chamber is supplied to the internal combustion engine, and further, the housing is provided with a second inlet-side conduit at one end having a second flow inlet through which the coolant heated in the combustion engine not passing through the radiator is introduced.

3. The thermostat device according to claim 1, wherein the valve seat has a tapered shape with the diameter expanding from the one-end side toward the other-end side of the direction of movement of the thermo-element, and one end on the valve-seat side of the slope is connected to one end on the other-end side of the valve seat ends.

* * * * *